Jan. 14, 1958   J. G. DICKSON   2,819,705
CUSHIONED VALVE TAPPET

Filed March 2, 1954   2 Sheets-Sheet 1

Inventor
James G. Dickson by Parker & Carter
Attorneys

Jan. 14, 1958     J. G. DICKSON     2,819,705
CUSHIONED VALVE TAPPET
Filed March 2, 1954     2 Sheets-Sheet 2
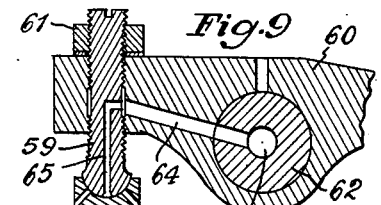
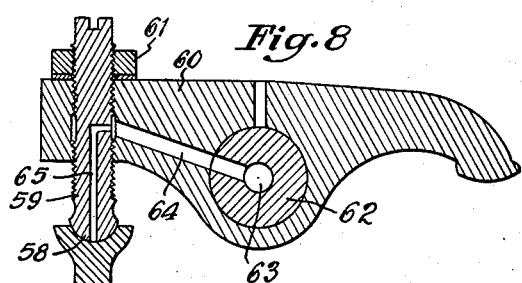
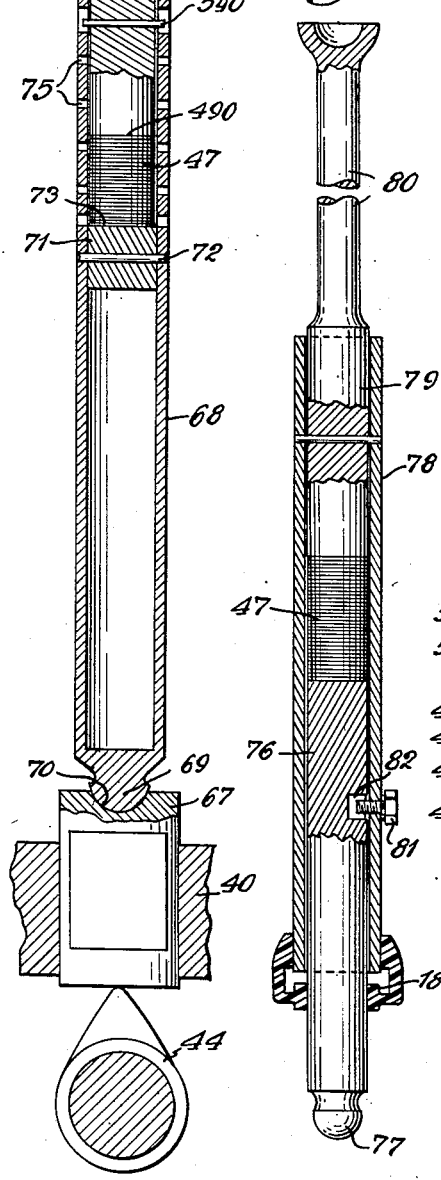
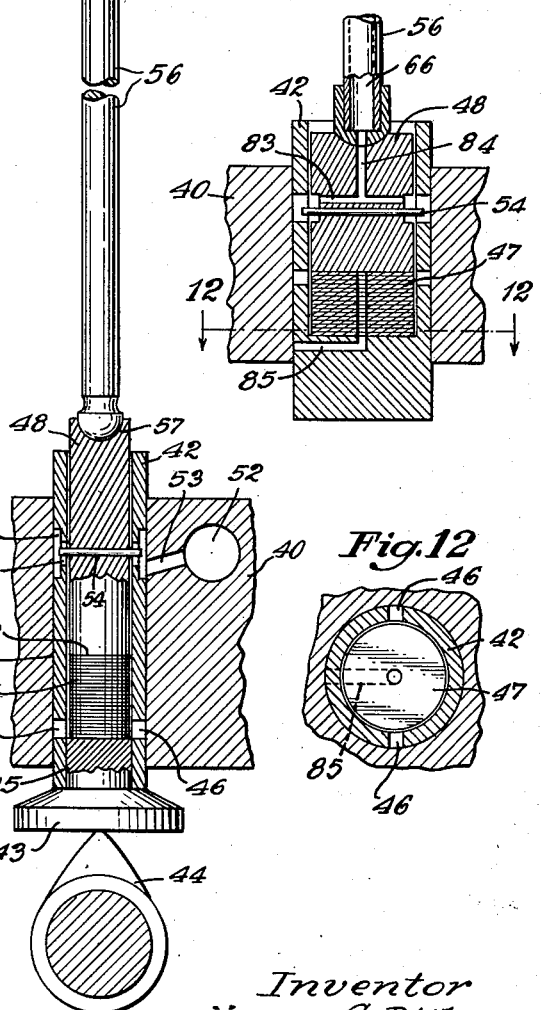
Inventor
James G. Dickson
by Parker & Carter
Attorneys

# United States Patent Office 2,819,705
Patented Jan. 14, 1958

2,819,705

CUSHIONED VALVE TAPPET

James G. Dickson, Glencoe, Ill.

Application March 2, 1954, Serial No. 413,554

10 Claims. (Cl. 123—90)

This application is a continuation in part of my copending application Serial No. 107,358, filed July 28, 1949, for "Cushioned Valve Tappet," now abandoned.

My invention relates to improvements in cushioned valve tappets and has for one object to provide means for minimizing shock and noise in connection with the valve tappet of poppet valves especially as used in connection with internal combustion engines.

It is well known that when a poppet valve is actuated by a cam with a connecting mechanism between the cam and the valve, this mechanical connection may change in length as the temperature of the engine and the connecting mechanism varies. Therefore, a certain amount of clearance is necessary in the actuating mechanism between the valve cam and the valve itself. This clearance varies from time to time. In order that this clearance may be reduced to a minimum and in order to minimize noise and shock and especially the characteristic clicking in the valve mechanism, some kind of cushioning means has for a long time been used in internal combustion engines. This cushioning means has taken the form of springs, hydraulic mechanisms, rubber or plastic cushioning mechanisms and the like but all of them for one reason or another presented difficulties which it is the purpose of my invention to overcome.

I propose to use not a spring and not a plastic compressible member but to relay upon the spring effect of a plurality of relatively but not completely flat disks made out of sheet metal and having the variations in thickness found in the production of sheet metal ordinarily and in addition under some circumstances to rely upon the surface tension of a liquid, preferably lubricating oil and its adhesion to a metal, preferably steel, to give the desired cushioning effect.

I propose to put into the system between the cam or other valve actuating mechanism and the poppet valve itself, a cushioning member which comprises a pile of thin, flat, parallel surfaced metallic disks or plates or washers, all preferably enclosed within a bath of oil. If desired, the disks themselves owing to their inherent minute microscopic variations in dimensions may when brought together in a pile serve, even when dry, as a satisfactory spring. However, when wet with oil, the opposed metallic surfaces may be separated by an oil film, the characteristic of which is that when pressure is applied to the pile or stack of plates or sheets or disks, the oil tending to adhere to the surfaces, trapped between the flat disks, yields to pressure and reacts when pressure is removed to a micrometric degree so that in effect this pile of disks serves with the oil as a cushion.

In addition to whatever cushioning effect may be added to the stack of disks by the presence of the oil film, it will be obvious that oil is highly desirable in any event as a protective medium to keep the stacks from rusting and to protect them against the introduction of foreign matter.

This is in sharp contrast with the use of curved disks or leaf springs where the metal itself in shear provides the cushion effect. While for the purpose of circulation through the bath, the oil is under or may be under the pressure characteristic of the lubricating system, the oil pressure is entirely inadequate to form the cushioning effect and the cushioning effect would be equally present even if the oil in the bath were at atmospheric or even sub-atmospheric pressure.

This spring or cushioning effect which I obtain by the presence of a multiplicity of flat, parallel surfaced disks or plates is especially well adapted to cushion the shock in the valve actuating mechanism of an internal combustion engine but this cushioning device and this cushioning effect may be equally well adapted to other circumstances where cushioning effect of very small amplitude is desired.

Other objects will appear from time to time throughout the specification and claims.

My invention is illustrated more or less diagrammatically in the accompanying drawings, wherein:

Figure 8 is a section illustrating my inveniton as applied to an overhead valve construction;

Figure 9 is a further similar modification;

Figure 10 is a further modification;

Figure 11 is a still further modified form; and

Figure 12 is a section along the line 12—12 of Figure 11.

Like parts are indicated by like characters throughout the specification and drawings.

Figure 1:
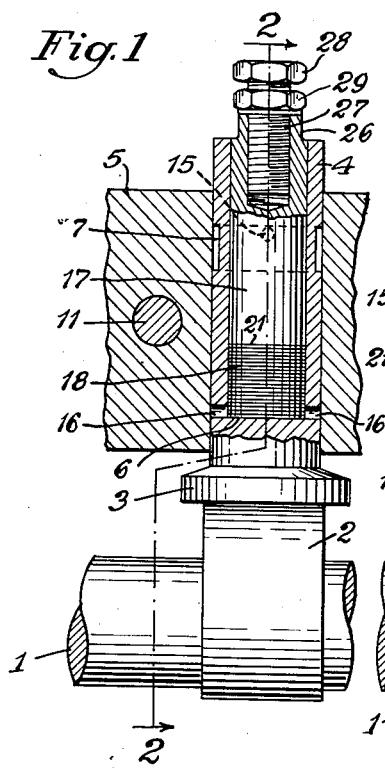
Figure 1 is a partial section through a cam tappet.

1 is a cam shaft. 2 is a cam. 3 is a cam tappet having a surface adapted to engage the cam. 4 is a hollow stem extending upwardly from and integral with the tappet 3. It is mounted to reciprocate in a tappet guide or bracket 5.

The hollow stem 4 is interiorly cylindrical, open at the top and has a plane continuous floor 6 at the bottom of the opening. 7 is a groove encircling the outer periphery of the sleeve 4. 8 is a duct in the engine casting 9. This duct communicates with an oil chamber 10 which is closed by the tappet guide or bracket 5, the guide being held in closing position by screws or bolts 11.

12 is an oil passage extending through the guide 5 from the oil chamber 10 and discharging into the cylindrical interior of the sleeve 4 adjacent the upper portion of the guide 5. 13 is an oil passage extending from the chamber 10 to communicate with an elongated groove 14 in the inner wall of the guide 5. The passage 12 directly and the passage 13 through the groove 14 both communicate with the groove 7 so that when lubricating oil at engine lubricating pressure is admitted to the chamber 10, it finds its way through the channels 12 and 13 into the interior of the guide 5 to lubricate the tappet sleeve 4 in the usual manner and oil under engine lubrication pressure is free to circulate about the periphery of the sleeve 4 and to travel both upwardly and downwardly along the bearing surfaces between the sleeve 4 and the guide 5.

Communicating with the interior of the sleeve 4 extending through the wall of the sleeve are a plurality of oil passages 15 so that oil admitted to the groove 7 through these passages enters the interior of the sleeve.

Figure 2:
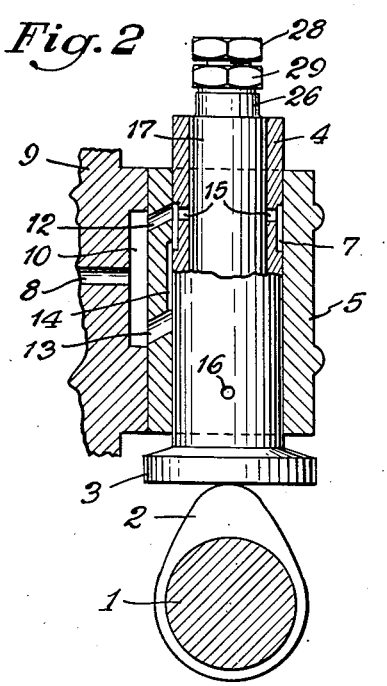
Figure 2 is a partial section along the line 2—2 of Figure 1.
Figure 5:
Figure 5 is a perspective view of one of the disks.
Figure 6:
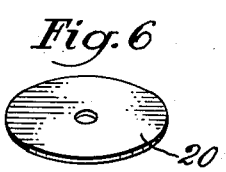
Figure 6 is a perspective view of a modified form of disk.
Figure 7:
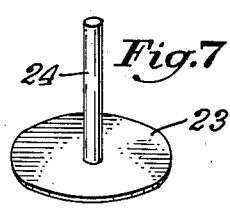
Figure 7 is a perspective view of the disk of Figure 6 showing the stem which may be associated therewith.

Extending through the wall of the sleeve 4, adjacent the lower end of the sleeve, preferably in line with the plane bottom 6 are a series of oil passages 16. In the position shown in Figures 1 and 2, oil is freely admitted to the interior of the sleeve 4 but can only escape from the sleeve 4 along a bearing clearance between the sleeve 4 and the guide 5. But when the cam is in the down position and the tappets 3 are in the position shown in Figures 3 and 4, then while oil is still admitted to the channel or groove 7 under pressure from the engine lubricating system, that oil may escape freely from the bottom of the sleeve 4 through the openings 16 which are now below the bottom of the valve tappet guide. Under these circumstances, the oil spurts out through these openings and assists in lubricating the adjacent cams and tappets. These openings 16 may be radial but if desired to promote rotation of the tappet and sleeve, they may be inclined to the radius though in many cases such inclination is not necessary as for some reason experience shows that the tappets tend to rotate in any event.

Contained within the hollow sleeve 4 is a plunger or piston 17. This plunger or piston is cylindrical and makes a working reciprocating fit with the inner cylindrical wall of the sleeve 4. Contained within the bottom of the cylindrical opening of the sleeve 4 is a cushion 18 made up of a pile or stack of plane disks 19 or washers 20. The bottom end 21 of the piston or plunger 17 is plane and parallel with the plane surface 6 and the cushion 18 or stack of disks 19 or 20 as the case may be, compressed between these two plane parallel surfaces. The surfaces of the disks themselves are plane and parallel. It is, of course, not necessary that these be optical flats but ordinary commercial parallelism is sufficient. Experience has taught that these disks may be punched out of ordinary mild steel shim stock and so long as they are smooth and have no rough edges and are not bowed and they are as parallel as the shim stock, that is sufficient.

Figure 3:
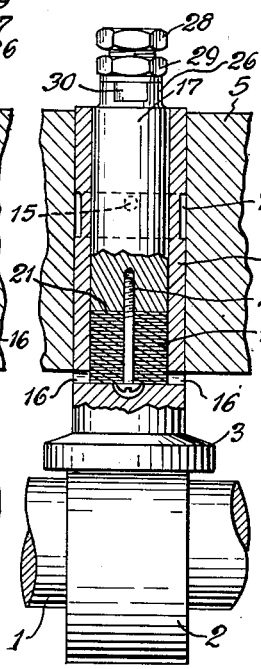
Figure 3 is a section similar to the section of Figure 1 through a modified form.
Figure 4:
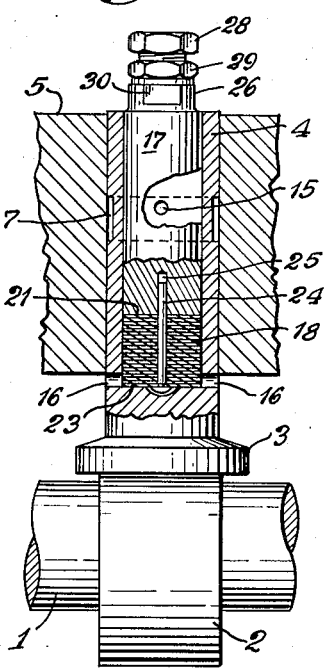
Figure 4 is a section similar to the section of Figure 1 through a further modified form.

In the modified form shown in Figure 3, the disks 20 are held to the underside of the plunger 17 by a screw 22. In the modified form shown in Figure 4, the bottom disk 23 has a pin 24 which passes upwardly through the disks 20 and penetrates a cylindrical aperture 25 in the plunger 17.

When the screw 22 or the pin 24 is used, the central portion of the plane surface 6 is sufficiently relieved so that no pressure will be applied to the head of the pin or the screw and so that the disks will rest smoothly on the surface 6.

Extending upwardly from the plungers 17 is a sleeve 26 interiorly threaded to contain a screw 27 having a hardened, hexagonal head 28, which contacts and rides on the bottom of the valve stem as the lifter revolves, and a lock nut 29, the sleeve 26 being flattened at 30 so that the screw and lock nut may be adjusted in the plunger 17 to set the desired clearance. The connection between the head 28 and the poppet valve being well known in the automotive industry, form no part of the present invention.

For convenience of manufacture and use especially in connection with the internal combustion engine field where my invention is especially useful, I have shown circular disks. These disks do not make a snug fit with the interior of the sleeve. They are loose enough so that they can be dropped in and so that there will be ample opportunity for oil passage or movement between the periphery of each disk and the inner wall of the sleeve but in the main in the device of Figure 1 they will remain in alignment because there is not enough room for them to get substantially out of alignment in the sleeve. The purpose of the screw 22 is to make it possible to assemble the disks on the plunger before the plunger is assembled in the valve guide, if desired. The same is true of the arrangement of Figure 4, where a pin 24 is used.

It must be remembered that the screw 22 and the pin 24 have no function in connection with the cushion effect of the apparatus. They merely assist in assembly.

Figures 8 to 11 inclusive disclose my invention as used with overhead rather than the L head valves of Figures 1 to 7 inclusive.

40 is a tappet guide apertured at 41 to slidably receive the hollow stem or sleeve 42 which carries the tappet 43 in opposition to a cam 44. The sleeve 42 has a plane floor 45. Aligned with the floor are one or more radial ports 46 through the wall of the sleeve 42. Contained within the sleeve resting on the floor 45 is a stack of thin metal disks or shims 47 of such diameter as to be loosely held in alignment in the sleeve 42. 48 is a plunger longitudinally movable in and closely fitting the sleeve 42 having a plane face 49 so that the stack of shims or disks 47 may be compressed between the floor 45 and the face 49. 50 is an oil hole or slot radially extending through the sleeve 42 communicating with an annular groove 51, which in turn communicates with the oil supply line 52 through duct 53. 54 is a pin extending through the plunger 48 projecting at both ends therebeyond into engagement with a longitudinal slot or slots 50 in the wall of the sleeve of such width and length that relative angular movement of plunger 48 and sleeve 42 is prevented while the two are free to move longitudinally with respect to one another.

56 is a push rod socket at 57 in the upper end of the plunger 48 socketed to be engaged by the spherical head 58 of adjustable push member 59. Member 59 is threaded in the valve rocker 60 and carries a nut 61 by which the adjustment may be locked. 62 is a bearing pin upon which the rocker 60 may rotate, it is centrally apertured at 63 to receive oil under pressure which escapes through the duct 64 in the rocker 60 to duct 65 in the adjustable member 59.

In Figure 9, cam 44 engages tappet 67 slidable in tappet guide 40. A sleeve 68 having spherical head 69 at its lower end engages the socket 70 in the tappet 67, contains a block 71 anchored by a pin 72 to provide a plane floor 73 like the floor 45 in Figure 8. The stack of shims or disks 47 contained within the sleeve 68 will be compressed between the floor 73 and a face 490 on plunger 480, which is held against angular rotation though free to move longitudinally with respect to sleeve 68 by the pin 540. The sleeve 68 is provided with a multiplicity of apertures 75 so that oil may enter and leave the space between the opposed surfaces 71 and 490 and lubricate the stack of disks 47. No means are here provided to force oil under pressure into the chamber containing stack 47 but since the push rod works always in an enclosed chamber containing oil mist and splash, surface tension is relied upon to cause oil which enters the chamber to penetrate between the cushion disks.

In Figure 10, the elements are reversed. The plunger 76 has a convex head 77 to engage a valve follower. The sleeve 78 is open toward the bottom being closed at the top by the block 79 which forms the end of a push rod 80. The plunger is held against angular rotation though free to move longitudinally with respect to the sleeve 78 by the screw 81 in the sleeve 78 engaging a slot 82 in the plunger so as to limit longitudinal relative movement and prevent rotation of the plunger with respect to the sleeve. 183 is a seal of neoprene or other material which seals the lower open space between the plunger 76 and the sleeve 78 to prevent entrance of foreign material. In this case the disks are dry and so a larger number is necessary to form a satisfactory cushion.

In Figure 11 the plunger 48 has an oil duct 84 in communication with a duct 66 in the push rod 56 and with a transverse oil passage 83. Oil under pressure entering through the ducts 66, 84 and 83 travels along the clearance between the plunger 48 and sleeve 42 to enter the chamber containing the disks. Since each disk is centrally apertured, oil passes inwardly between the disks for discharge into the chamber formed by the concentric disk apertures whence the oil escapes through duct 85. This duct is closed when the follower is in the upper position, open when the follower is in the lower position just as are the ports 46 so that the oil may pass out through the cushion chamber and so that there is no catch basin or cess pool where oil rests for deposit of foreign matter. The oil thus travels through and around the oil cushion in a continuous and intermittent motion and all foreign matter which might otherwise be dropped in the cushion chamber to come up and prevent its operation is washed through the system.

The use and operation of my invention are as follows: As the engine operates and the tappet plunger moves up and down under the influence of the cam and lubrication oil is circulated through the engine system, the oil is continuously entering the guide 5 to lubricate the bearing surface between the guide and the sleeve 4. It also enters the interior of the sleeve 4 independent of the position of the sleeve and passes down around the plunger or piston 17 around the stack 18 out through the plunger holes or oil passages 16 to assist in lubricating the lower portion of the tappet guide. But when the tappets are in the lower position and the holes 16 are no longer masked by the guide 5, the pressure within the sleeve 4 is reduced and oil escapes freely from the bottom of the hollow sleeve 4. Thus there is maintained in the sleeve 4, an oil bath in which the disks making up the cushion pack 18 are continuously immersed. As a result, foreign matter, if any, entering the system is always being washed out without any tendency to penetrate between the capillary spaces between the adjacent disks. Thus the device is constantly maintained in a clean working condition. So the scavenging effect of the oil under pressure from the oil line working past the plunger into the disk chamber and out through the opening at the bottom of the sleeve maintains the same clean condition which is found in the engine bearings which is also under pressure from the oil line.

The cushion I provide thus is available at all times to protect the valve gear from the terrific lash of the cam at high speeds and also tends to eliminate or at least minimize the noise of the conventional tappet system.

As the number of disks is increased, the cushioning effect increases so that it is a simple matter of design to provide the number of disks necessary to give the desired cushioning effect. Provided that substantially the entire area of the disks are in line with the surfaces through which pressure is applied at top and bottom of the sleeve, the thickness of the disks is of little moment because the disks themselves are never under shear. They are under compression only throughout their entire opposed surfaces and therefore as the diameter of the disks increases the effective surface area of the disks increases, the number of disks within working range may be reduced or vice versa.

The cushion effect is obtained by the presence of the stack of separate thin metal disks which stack is protected by the oil bath or oil film and wherein the oil bath or oil film may perhaps under some circumstances add to the cushioning effect but in any event the oil bath or film effectively prevents introduction of foreign matter between the disks because the capillary space or distance between them is so small that while oil can enter, dirt and foreign matter cannot.

The discharge of the oil from the bottom of the sleeve at the time the tappet is in the down position, of course, does not have much lubrication effect on the cam actuating that particular sleeve but since in an internal combustion engine a series of cams, tappets and sleeves are arranged side by side, the discharge from one sleeve tends to lubricate the cam and tappets for an adjacent sleeve.

As the lifter rises on the cam, the opening at the bottom of the lifter is closed. Thus the only oil escaping from the disk chamber is that which leaks out between the bearing surfaces but when the lifter goes down, the oil is free to flow out.

Preferably before installing the device, it is thoroughly oiled both inside and out and any excess oil which may be found between the disks taking the form of too great a thickness of oil will be extruded as adjustment pressures are applied.

I have shown a location of the cushioning means and a location of the adjusting means which is convenient but it will be understood, of course, that these might both be otherwise positioned and the cushion may be applied in any part of the valve gear. The same is true of the adjusting means.

The shim stock which I have used successfully is .004 steel shim stock. Thicker or thinner stock might be used without interfering with the effectiveness of my invention. While I prefer to use cylindrical parts and circular disks, it is entirely possible to get the desired effect with disks of other shapes, square, oval or the like, and it is also possible to get the desired effect with disks the shape of which is radically different from the shape of the interior of the chamber in which they are contained, provided only that care is taken to be sure that in operation, the load in compression is applied to the disks throughout their entire area so that the disks work under pressure alone and nowhere under shear or bending. If the disks are so arranged that they work under shear or bending, a totally different phenomena occurs and under these circumstances, the cushioning effect is unpredictable and variable. The surfaces of the shim stock or similar sheet metal may be microscopically rough providing spaces for air or oil to penetrate between them. These minute hills and valleys when filled with air or oil provide a certain amount of resiliency, all of which cannot be crushed out when put under pressure. Neither is it possible to crush the plates into one piece of metal.

Another advantage of the pin 54 is that when in place it holds the plunger, the sleeve and the stack of disks in assembled relation so that in assembly or disassembly, the danger of losing some of the disks and so losing the cushion is obviated.

Since the openings 85 open first and close last with respect to the openings 46, there is opportunity for oil to be forced through the disks and this, together with the opening 46 prevents the accumulation of carbon or solids which might ultimately come up and prevent cushion effect of the disks. There are no reservoirs or pockets in any of the modifications shown where foreign matter may precipitate out of the oil and collect. Oil is always passing through the cushion chamber and taking with it any solids which are in suspension. Since oil is filtered from the outer periphery toward the center of the disks in the device of Figure 11, any solids screened from the oil deposited on the outer periphery of the disks will be flushed out through the discharge apertures 46.

I claim:

1. A cushion for internal combustion engine valves and the like, including a cylindrical sleeve, open at one end, a multiplicity of thin, flat, parallel faced metallic disks, the diameter of which is approximately the same as the bore of the sleeve, contained in the sleeve and arranged in a stack, a plunger in the sleeve remote from and out of direct contact with the valve actuating cam, having a plane face parallel with the disk faces, engaging one end of the stack, there being a plane faced abutment engaging the other end of the stack coextensive with and parallel with the disk faces, the plunger being a working fit in the sleeve free to move longitudinally therein, the area of contact between the plunger and the sleeve being long enough to positively maintain sleeve and plunger axes in parallel and in alignment.

2. A cushion for internal combustion engine valves and the like, including a cylindrical sleeve, open at one end, a multiplicity of thin, flat, parallel faced metallic disks, the diameter of which is approximately the same as the bore of the sleeve, contained in the sleeve and arranged in a stack, a plunger fitting in, and longitudinally movable in the sleeve and constrained thereby to movement along a path parallel with the axis of the stack, remote from and out of direct contact with the valve actuating cam, having a plane face parallel with the disk faces, engaging one end of the stack, there being a plane faced abutment engaging with the other end of the stack coextensive with and parallel with the disk faces, and the wall of the sleeve being apertured to permit lubricant to enter the disk chamber and also apertured adjacent to the bottom of the stack of disks to discharge the lubricant.

3. A cushion for internal combustion engine valves and the like, including a cylindrical sleeve, open at one end, a multiplicity of thin, flat, parallel faced metallic disks, the diameter of which is approximately the same as the bore of the sleeve, contained in the sleeve and arranged in a stack, a plunger fitting in, and longitudinally movable in the sleeve and constrained thereby to movement along a path parallel with the axis of the stack, remote from and out of direct contact with the valve actuating cam, having a plane face parallel with the disk faces, engaging one end of the stack, there being a plane faced abutment engaging the other end of the stack coextensive with and parallel with the disk faces, and a guide member in which the sleeve is socketed for longitudinal reciprocation, the wall of the sleeve being apertured to permit lubricant to enter the disk chamber and also apertured adjacent to the bottom of the stack of disks to discharge the lubricant, the sleeve being so positioned in the guide member that the discharge apertures are masked and closed thereby except at one end of the excursion of the sleeve.

4. A cushion for internal combustion engine valves and the like, including a cylindrical sleeve, open at one end, a multiplicity of thin, flat parallel faced metallic disks, the diameter of which is approximately the same as the bore of the sleeve, contained in the sleeve and arranged in a stack, a plunger fitting in, and longitudinally movable in the sleeve and constrained thereby to movement along a path parallel with the axis of the stack, remote from and out of direct contact with the valve actuating cam, having a plane face parallel with the disk faces, engaging one end of the stack, there being a plane faced abutment engaging the other end of the stack coextensive with and parallel with the disk faces, means for positively preventing relative angular movement of the plunger and the sleeve, said means including a pin extending through the plunger and engaging the sleeve, the sleeve being longitudinally slotted to receive said pin.

5. A cushion for internal combustion engine valves and the like, including a cylindrical sleeve, open at one end, a multiplicity of thin, flat parallel faced metallic disks, the diameter of which is approximately the same as the bore of the sleeve, contained in the sleeve and arranged in a stack, a plunger fitting in, and longitudinally movable in the sleeve and constrained thereby to movement along a path parallel with the axis of the stack, remote from and out of direct contact with the valve actuating cam, having a plane face parallel with the disk faces, engaging one end of the stack, there being a plane faced abutment engaging the other end of the stack coextensive with and parallel with the disk faces, means for positively preventing relative angular movement of the plunger and the sleeve.

6. A cushion for internal combustion engine valves and the like, including a cylindrical sleeve, open at one end, a multiplicity of thin, flat parallel faced metallic disks, the diameter of which is approximately the same as the bore of the sleeve, contained in the sleeve and arranged in a stack, a plunger fitting in, and longitudinally movable in the sleeve and constrained thereby to movement along a path parallel with the axis of the stack, remote from and out of direct contact with the valve actuating cam, having a plane face parallel with the disk faces, engaging one end of the stack, there being a plane faced abutment engaging the other end of the stack coextensive with and parallel with the disk faces, means for positively preventing relative angular movement of the plunger and the sleeve, said means including a screw threaded in the sleeve, the plunger being longitudinally slotted to receive the screw.

7. A cushion for internal combustion engine valves and the like, including a cylindrical sleeve, open at one end, a multiplicity of thin, flat parallel faced metallic disks, the diameter of which is approximately the same as the bore of the sleeve, contained in the sleeve and arranged in a stack, a plunger fitting in, and longitudinally movable in the sleeve and constrained thereby to movement along a path parallel with the axis of the stack, remote from and out of direct contact with the valve actuating cam, having a plane face parallel with the disk faces, engaging one end of the stack, there being a plane faced abutment engaging the other end of the stack coextensive with and parallel with the disk faces, each disk being centrally apertured, means for supplying oil under pressure to the outer periphery of the stack of disks and means for discharging oil from the lower end of the chamber defined by the central aperutres of the disks.

8. A cushion for internal combustion engine valves and the like, including a cylindrical sleeve, open at one end, a multiplicity of thin, flat parallel faced metallic disks, the diameter of which is approximately the same as the bore of the sleeve, contained in the sleeve and arranged in a stack, a plunger fitting in, and longitudinally movable in the sleeve and constrained thereby to movement along a path parallel with the axis of the stack, remote from and out of direct contact with the valve actuating cam, having a plane face parallel with the disk faces, engaging one end of the stack, there being a plane faced abutment engaging the other end of the stack coextensive with and parallel with the disk faces, each disk being centrally apertured, means for supplying oil under pressure to the outer periphery of the stack of disks and means for discharging oil from the lower end of the chamber defined by the central apertures of the disks, said discharge means comprising a radial oil duct communicating with the central portion of the stack of disks, a guide in which the sleeve may reciprocate, said guide being adapted when the sleeve is in the upper position to close the duct and when it is in the lower position to open it.

9. A cushion for internal combustion engine valves and the like, including a cylindrical sleeve, open at one end, a multiplicity of thin, flat, parallel faced metallic disks, the diameter of which is approximately the same as the bore of the sleeve, contained in the sleeve and arranged in a stack, a plunger fitting in, and longitudinally movable in the sleeve and constrained thereby to movement along a path parallel with the axis of the stack, remote from and out of direct contact with the valve actuating cam, having a plane face parallel with the disk faces, engaging one end of the stack, there being a plane faced abutment engaging with the other end of the stack coextensive with and parallel with the disk faces, and the wall of the sleeve being apertured to permit lubricant to enter the disk chamber and also apertured adjacent to the bottom of the stack of disks to discharge the lubricant, means for positively preventing relative angular movement of the plunger and the sleeve.

10. A cushion for internal combustion engine valves and the like, including a cylindrical sleeve, open at one end, a multiplicity of thin, flat, parallel faced metallic disks, the diameter of which is approximately the same as the bore of the sleeve, contained in the sleeve and arranged in a stack, a plunger fitting in, and longitudinally movable in the sleeve and constrained thereby to movement along a path parallel with the axis of the stack, remote from and out of direct contact with the valve actuating cam, having a plane face parallel with the disk faces, engaging one end of the stack, there being a plane faced abutment engaging with the other end of the stack coextensive with and parallel with the disk faces, and the wall of the sleeve being apertured to permit lubricant to enter the disk chamber and also apertured adjacent to the bottom of the stack of disks to discharge the lubricant, the disks being all of them centrally apertured, exposed at their outer periphery to the outer periphery of the disk chamber, there being a duct in register with the centrally apertured portion of the stack of disks and the aperture adjacent the bottom of the stack of disks.

References Cited in the file of this patent

UNITED STATES PATENTS

| | | |
|---|---|---|
| 976,274 | McHardy | Nov. 22, 1910 |
| 1,085,512 | Townsan | Jan. 27, 1914 |
| 1,696,866 | Seaman | Dec. 25, 1928 |
| 1,785,596 | Petersen | Dec. 16, 1930 |
| 1,913,241 | Kuse | June 6, 1933 |
| 2,044,598 | Wallace | June 16, 1936 |
| 2,206,869 | Banker | July 9, 1940 |

FOREIGN PATENTS

| | | |
|---|---|---|
| 345,262 | Great Britain | Mar. 16, 1931 |